United States Patent
Gil et al.

(10) Patent No.: US 7,780,748 B2
(45) Date of Patent: Aug. 24, 2010

(54) THIN TYPE MICRO REFORMING APPARATUS

(75) Inventors: Jae Hyoung Gil, Seoul (KR); Jae Hyuk Jang, Kyungki-do (KR); Sang Jin Kim, Kyungki-do (KR); Sung Han Kim, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 307 days.

(21) Appl. No.: 11/527,407

(22) Filed: Sep. 27, 2006

(65) Prior Publication Data

US 2007/0077186 A1   Apr. 5, 2007

(30) Foreign Application Priority Data

Sep. 30, 2005   (KR) .................... 10-2005-0092065

(51) Int. Cl.
*B01J 10/00* (2006.01)
*B01J 8/04* (2006.01)

(52) U.S. Cl. ..................... 48/61; 48/118.5; 422/189

(58) Field of Classification Search ............ 422/189, 422/198

See application file for complete search history.

(56) References Cited

U.S. PATENT DOCUMENTS

| 2004/0244290 | A1* | 12/2004 | Yamamoto et al. | ......... 48/127.9 |
| 2005/0087767 | A1* | 4/2005 | Fitzgerald et al. | ........... 257/200 |
| 2006/0016216 | A1* | 1/2006 | Tonkovich et al. | ............. 62/617 |

FOREIGN PATENT DOCUMENTS

| JP | 2003-48701 | | 2/2003 |
| JP | 2003-342003 | A | 12/2003 |
| JP | 2004-066008 | A | 3/2004 |
| JP | 2004-89748 | | 3/2004 |
| JP | 2004-275807 | | 10/2004 |
| JP | 2005-233477 | A | 9/2005 |

OTHER PUBLICATIONS

Machine Translation of specification of JP 2005-233477 A.*
Japanese Office Action issued in Japanese Patent Application No. JP 2006-267936 dated Sep. 29, 2009.

* cited by examiner

*Primary Examiner*—Alexa D Neckel
*Assistant Examiner*—Imran Akram
(74) *Attorney, Agent, or Firm*—McDermott Will & Emery LLP

(57) ABSTRACT

A thin type reforming apparatus used for a fuel cell is provided. In the thin type reforming apparatus, a substrate has a passage formed therein, and a fuel inlet introduces fuel to the passage. An evaporator is disposed within the substrate downstream of the fuel inlet, and includes a bubble remover for imparting a flow resistance to the fuel in a liquid state, removing bubbles and vaporizing the fuel. A reformer has a passage formed downstream of the evaporator, and reforms the fuel to hydrogen gas through a heat absorbing reaction. A CO remover has a passage formed downstream of the reformer and removes CO gas included in the hydrogen gas through a heat radiating reaction. A cover covers an upper portion of the substrate and sealing the passages from an outside.

6 Claims, 7 Drawing Sheets

THIN TYPE MICRO REFORMING APPARATUS

RELATED APPLICATION

The present application is based on, and claims priority from, Korean Application Number 2005-92065, filed Sep. 30 2005, the disclosure of which is hereby incorporated by reference herein in its entirety.

BACKGROUND OF THE INVENTION

1. Field of the Invention

The present invention relates to a thin type micro reforming apparatus used in a fuel cell, and more particularly, to an improved thin type micro reforming apparatus having a bubble remover in the evaporator to effectively remove bubbles formed during the vaporizing of liquid fuel, in order to prevent a pressure buildup within the evaporator and increase heat transfer efficiency. The improved thin type micro reforming apparatus also supplies liquid fuel in the form of droplets to be vaporized in the evaporator, thereby to prevent reverse flow caused by back pressure of the liquid fuel.

2. Description of the Related Art

A recent increase in the use of mobile phones, PDAs, digital cameras, laptop computers, and other small, portable electronic devices—and especially, the beginning of DMB broadcasting for mobile phones—has given rise to a need for more effective power supplies for portable, compact terminals. Lithium ion secondary cell batteries used widely today provide power for only 2 hours of DMB viewing. While efforts are underway to enhance their performance, the fuel cell is increasingly being viewed as a more viable solution to the above problem.

Such fuel cells include direct methanol type fuel cells that supply methanol directly to fuel electrodes, and reformed hydrogen fuel cells (RHFC) that extract hydrogen from methanol to supply to fuel electrodes. RHFC fuel cells use hydrogen as fuel, as in a polymer electrode membrane (PEM), and have the benefits of high output, power capacity available by volume unit, and no byproducts other than water. However, a reforming apparatus needs to be added to the system, making the device unsuitable for miniaturization.

To derive a high power output from such a fuel cell, a reforming apparatus must be used to convert liquid fuel to hydrogen gas fuel. This type of reforming apparatus includes an evaporator for converting liquid methanol to a gaseous form, a reformer that converts methanol fuel to hydrogen through catalytic conversion at a temperature between 250° C. and 290° C., and a CO remover (or a PROX) that removes the byproduct carbon monoxide. The reformer (that reacts to absorb heat) should be maintained at a temperature between 250° C. and 290° C., the CO remover should be maintained at a constant temperature between 170° C. and 200° C., in order to produce optimum reaction efficiency.

As shown in FIG. 1, a conventional reforming apparatus 250 is disclosed in Japanese Patent No. 2003-048701, which is hereby incorporated by reference. This conventional compact reforming apparatus 250 has an evaporating chamber 252 within which a cavity 254 is disposed, and an evaporating heater 256 provided on the cavity 254. Also, a fuel injector 258 is provided in the cavity 254. The fuel injector 258 injects a mixture of methyl alcohol fuel and water into the cavity 254. This injected liquid fuel mixture 260 is heated and vaporized by the evaporating heater 256. The gas formed by the vaporized liquid fuel mixture 260 flows into micro passages 262, and is reformed into hydrogen and carbon dioxide by means of reformer catalytic converters 264 installed in the micro passages 262.

This conventional reforming apparatus provides the fuel injector 258 at the fuel supply conduit to increase the efficiency of the evaporator by widening the surface area of the fuel to increase vaporizing speed. Also, by using the fuel injector 258 to inject fuel, the liquid fuel mixture 260 is separated into droplets, increasing the surface area of the volume of fuel for the reforming apparatus, so that the reforming efficiency of increases for the same quantity of fuel.

However, this conventional reforming apparatus must be installed around the fuel injector 258, and the quantity of fuel injected through the fuel injector 258 must be controlled by a separately installed controller. Accordingly, not only is this conventional configuration of a reforming apparatus 250 complex, it is also difficult to miniaturize.

As shown in FIG. 2, another conventional reforming apparatus 300 is disclosed in Japanese Patent No. 2004-275807, which is hereby incorporated by reference. This type of reforming apparatus 300 has a plurality of heated medium passages 305 installed therein (through which a heated medium such as gas passes), and a first heating plate 312 and an adjacent second heating plate 313 that are heated by the heated medium passing through the heated medium passages 305. The second heating plate 313 has an evaporated liquid passage 316 with a passage width d2, and the evaporated liquid passage 316 has a plurality of protruding fins 317 formed with a height d1 on the side thereof. Because the height d1 of the fins 317 is less than the width d2 of the passage, the bubbles created by the evaporating liquid can easily expand past the fins 317 and increase heat transfer efficiency by forming a thin layer of the evaporated liquid.

That is, this conventional method installs the fins 317 having a height of approx. 30% or less of the width of the channel, so that when evaporation occurs, the bubbles created can expand along the fins 317 to form a thin layer on the insulating surface to efficiently transfer heat. However, because the height of the fins 317 and the width of the passage must be formed in different dimensions, either dry etching must be performed twice or the manufacturing process becomes difficult.

As shown in FIG. 3, another conventional reforming apparatus 400 is disclosed in Japanese Patent No. 2004-89748, which is hereby incorporated by reference. This conventional structure, an evaporator 403 is disposed on one side of a substrate 401 on which a passage extends, a reforming portion 404 and a CO removing portion 405 are successively disposed downstream along the passage, and a hydrogen discharge port 410 is disposed further downstream. However, in this conventional structure, although a passage extends from the evaporator 403, gas formation that occurs when liquid fuel is vaporized cannot be prevented.

Thus, in conventional reforming apparatuses, as fuel is vaporized in the evaporators, a sudden expansion occurs where bubbles are formed within the evaporator to increase pressure. The increase in pressure causes back pressure towards the fuel input portion to prevent further supply of fuel. Therefore, an improved structure for an evaporator is needed.

SUMMARY OF THE INVENTION

Accordingly, the present invention is directed to a thin type reforming apparatus that substantially obviates one or more problems due to limitations and disadvantages of the related art.

An object of the present invention is to provide an improved thin type reforming apparatus with a differently structured evaporator that supplies fuel in the form of small droplets to increase the surface area of the fuel, so that when the same amount of fuel is vaporized, an increased evaporating efficiency can obtained by the present invention.

Another object of the present invention is to provide an improved thin type reforming apparatus that can effectively prevent reverse flow of supplied fuel due to back pressure.

A further object of the present invention is to provide an improved thin type reforming apparatus with an expanded and opened evaporator to accommodate the expansion of gas and substantially reduce back pressure from the evaporator to the fuel supply portion.

A still further object of the present invention is to provide an improved thin type reforming apparatus that has protrusions in the form of islands within the evaporator, in order to facilitate the removal of bubbles in the liquid fuel during evaporation of the fuel, for preventing a buildup of back pressure and increase heat transfer efficiency to efficiently vaporize liquid fuel and improve performance.

An additional object of the present invention is to provide an improved thin type reforming apparatus that supplies liquid fuel inside the evaporator in the form of droplets, so that easy vaporization of the fuel can be achieved without the formation of bubbles, preventing reverse flow of the liquid fuel caused by back pressure, and allowing overall miniaturization of the reforming apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a thin type reforming apparatus used for a fuel cell, including: a substrate having a passage formed therein; a fuel inlet for introducing fuel to the passage; an evaporator disposed within the substrate downstream of the fuel inlet, and including a bubble remover for imparting a flow resistance to the fuel in a liquid state, removing bubbles and vaporizing the fuel; a reformer having a passage formed downstream of the evaporator, the reformer reforming the fuel to hydrogen gas through a heat absorbing reaction; a CO remover having a passage formed downstream of the reformer, the CO remover removing CO gas included in the hydrogen gas through a heat radiating reaction; and a cover for covering an upper portion of the substrate and sealing the passages from an outside.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
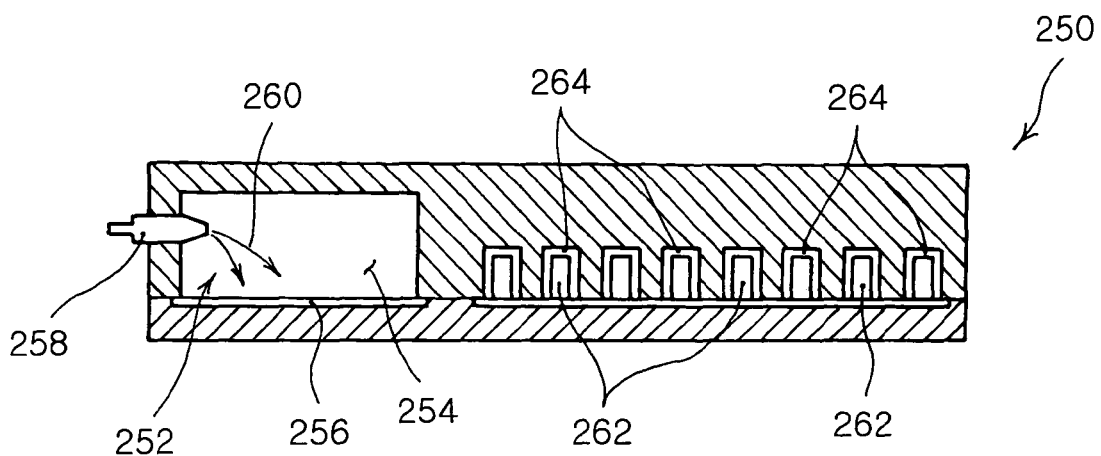
FIG. 1 is a sectional view of a reforming apparatus according to the related art.
Figure 2:
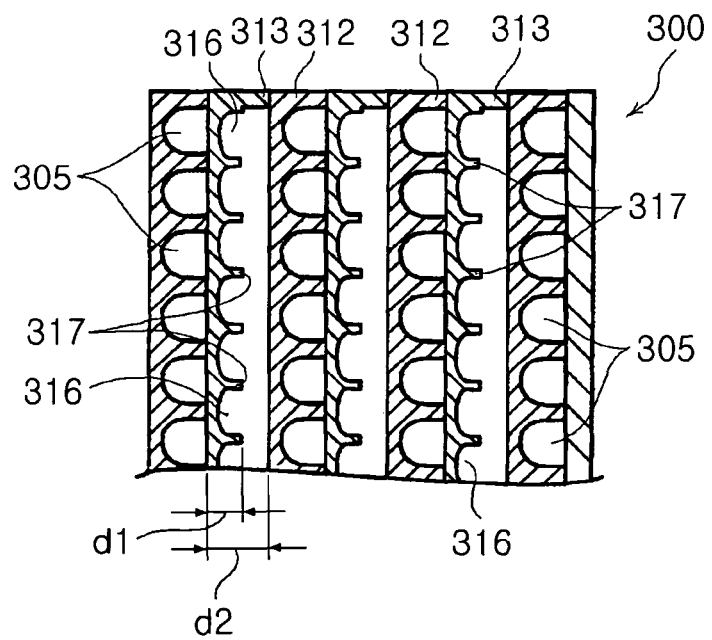
FIG. 2 is a sectional view of an alternately structured reforming apparatus according to the related art.
Figure 3:
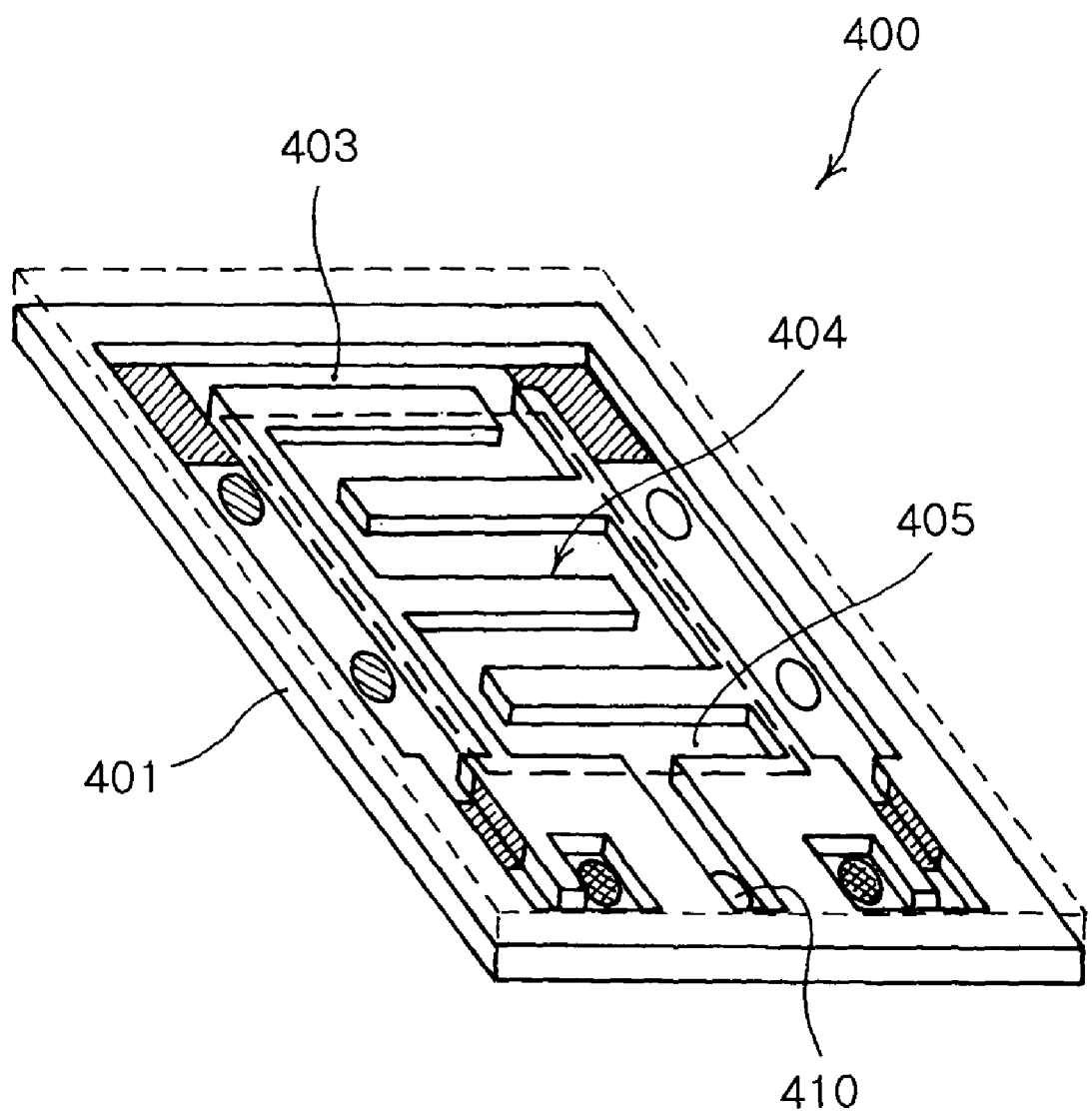
FIG. 3 is a perspective view of a reforming apparatus with yet another structure according to the related art.
Figure 4:
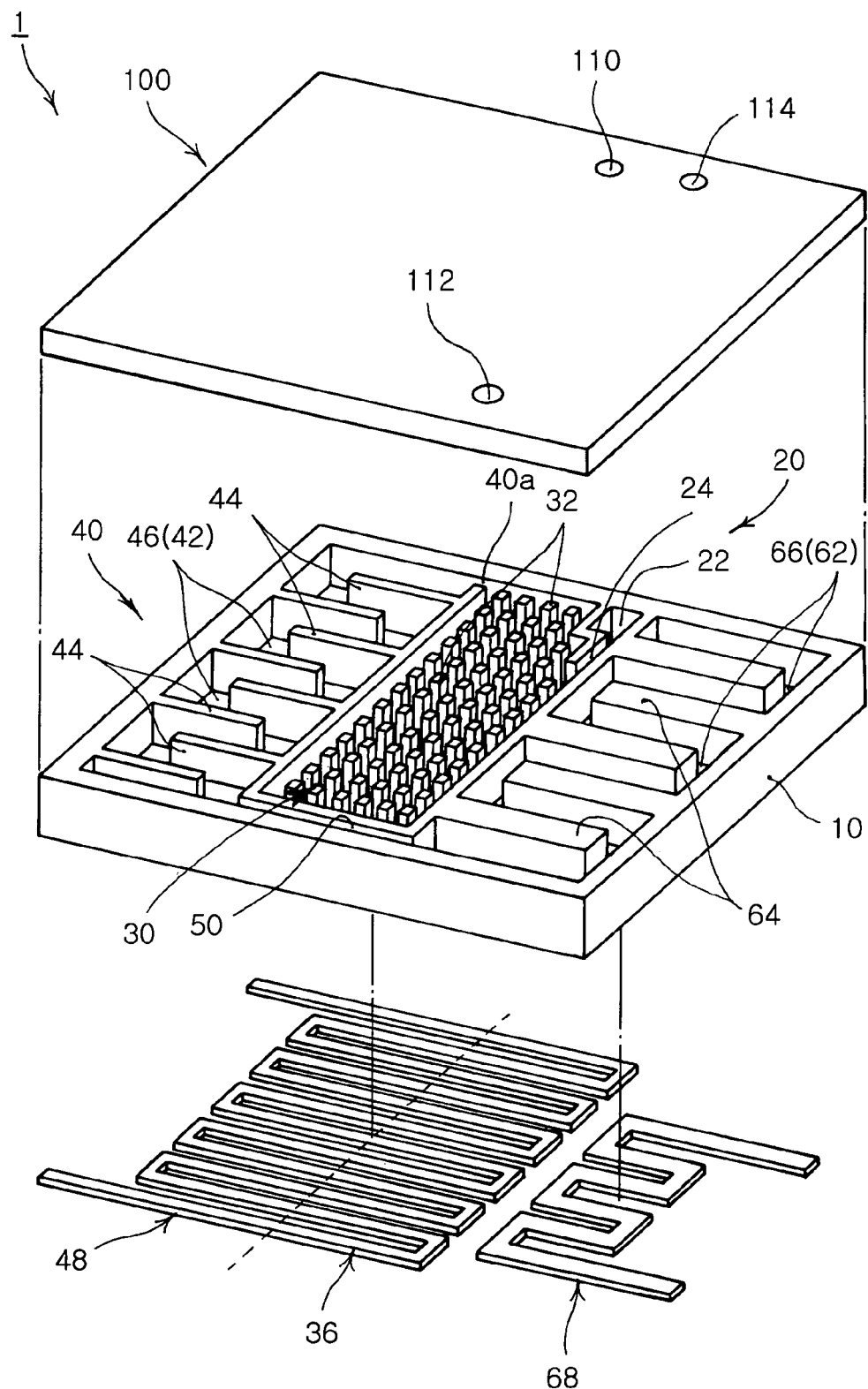
FIG. 4 is an exploded perspective view of a thin type reforming apparatus according to the present invention.

As shown in FIG. 4, a thin type reforming apparatus 1 according to an embodiment of the present invention includes a substrate 10 having a passage formed therein. The substrate 10 may be made of silicon, metal, glass, ceramic, and heat resistant plastic, and indented passages defined by partitions are formed in a regular manner through etching into one side of the substrate 10.

That is, etching is performed on one side of the substrate 10, forming a desired configuration of indented passages.

Figure 5:
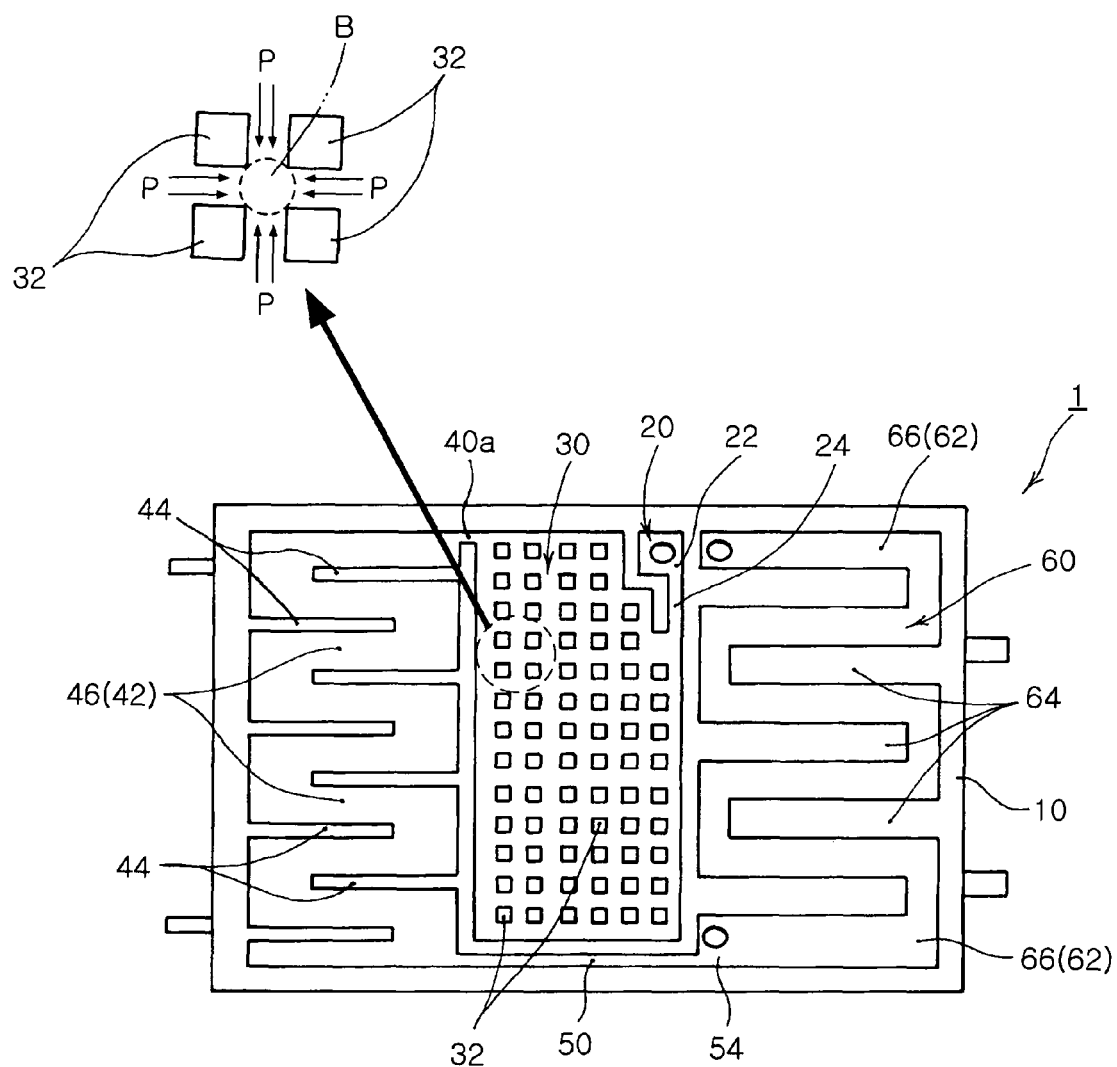
FIG. 5 is a plan view of a thin type reforming apparatus according to an embodiment of the present invention.

A fuel inlet 20 is provided to introduce fuel into the passages of the substrate 10. The fuel inlet 20, as shown in FIGS. 4 and 5, is formed at an approximate central location of the substrate 10. The passage 22 of the fuel inlet 20 is formed at one edge of the substrate 10, and leads to a narrow exit 24 to supply the liquid fuel to an evaporator 30 (described below) in the form of droplets.

To feed liquid fuel (methanol) to the fuel inlet 20, a fuel filling hole 110 is formed in the cover 100 covering the top of the substrate 10, so that the liquid fuel may be fed into the fuel inlet 20.

At the exit end of the fuel inlet 20, an evaporator 30, for heating the liquid fuel and converting it to a gaseous form, is formed. The evaporator 30 vaporizes liquid fuel so that it is in an optimum condition for reforming, communicates with the fuel inlet 20, and is disposed in the approximate center of the substrate 10. The evaporator 30 is a portion in which fuel (liquid methanol) is converted to a gaseous form, and has an open construction without passages, so that a maximum evaporation space is provided for the expansion that occurs when liquid is vaporized.

Compared to the fuel inlet 20, the evaporator 30 has large passages that minimize a buildup of back pressure when fuel is converted to a gaseous state, and allow reliable evaporation.

Also, because the evaporator 30 is formed from the exit 24 of the fuel inlet 20 to vaporize methanol fuel, the fuel inlet 20 forms a channel that is 10-100 µm in width. When discharging fuel, the exit 24 discharges small quantities of fuel in the form of droplets so that evaporating efficiency can be increased.

Due to the narrowness of the channel, the pressure used to fill the liquid methanol fuel must be increased, so that the pressure counteracts any back pressure created during the conversion of liquid fuel to a gaseous state. Also, the evaporator 30, being a heat source, includes a heating member 36 that is formed in an electrically resistant circuit pattern at the bottom surface of the substrate 10 to heat the evaporator 30 on the upper surface of the substrate 10 through the substrate 10.

Also, bubble removers 32 are formed in the evaporator 30 to remove bubbles by imparting a resistance to the flow of liquid fuel from the downstream end of the fuel inlet 20 by evaporating the fuel.

The bubble removers 32 are formed to protrude in the shape of islands, and are portions that prevent a buildup of pressure within the evaporator 30 by preventing the formation of bubbles (B) which would otherwise block the passages or block an entrance 40a of a reformer 40 (to be described below).

These protruding portions are formed in plurality throughout the evaporator 30 to quickly burst bubbles that may begin to form in the evaporator 30. Should the evaporator 30 be formed in a passage configuration and bubbles form at the edges of the evaporator 30, there are cases in which the bubbles cannot easily be removed by the pressure pushing the liquid fuel in from upstream. However, because of the bubble removers 32 formed within the evaporator 30, bubbles (B) that begin to form between the protrusions are subject to pressure from four directions and are thus easily burst, as shown in FIG. 5.

Also, in the inventive reforming apparatus, a passage 42 through which the fuel flows is formed within the substrate 10 at the downstream end of the evaporator 30, and a reformer 40 is formed to reform the fuel into hydrogen gas through heat absorption reacting. The reformer 40 is biased to one side of the substrate 10 and formed at the downstream end of the evaporator 30, and the passage 42 is connected to the entrance 40a within the evaporator 30. Partitioning walls 44 are formed to form the passage 42 of the reformer 40 in a predetermined serpentine pattern.

Thus, the passage 42 of the reformer 40 is formed in a serpentine zigzagging shape along the entire length of the evaporator 30. A catalyst 46 for reforming the fuel to hydrogen gas is formed inside the passage 42 of the reformer 40. Hydrogen is converted to an abundance of reformed gas through catalytic reaction of fuel in the reformer 40. As a catalyst 46 of the reformer 40, $Cu/ZnO$ or $Cu/ZnO/Al_2O_3$ is used. The catalyst 46 may be mounted to the partitioning walls 44 forming the passage 42.

In addition to the above catalyst 46 being formed by mounting to the partitioning walls 44, it may also be in the form of particles that are filled in the reformer 40, and fuel and gas may be made to flow between the particles.

Figure 7:
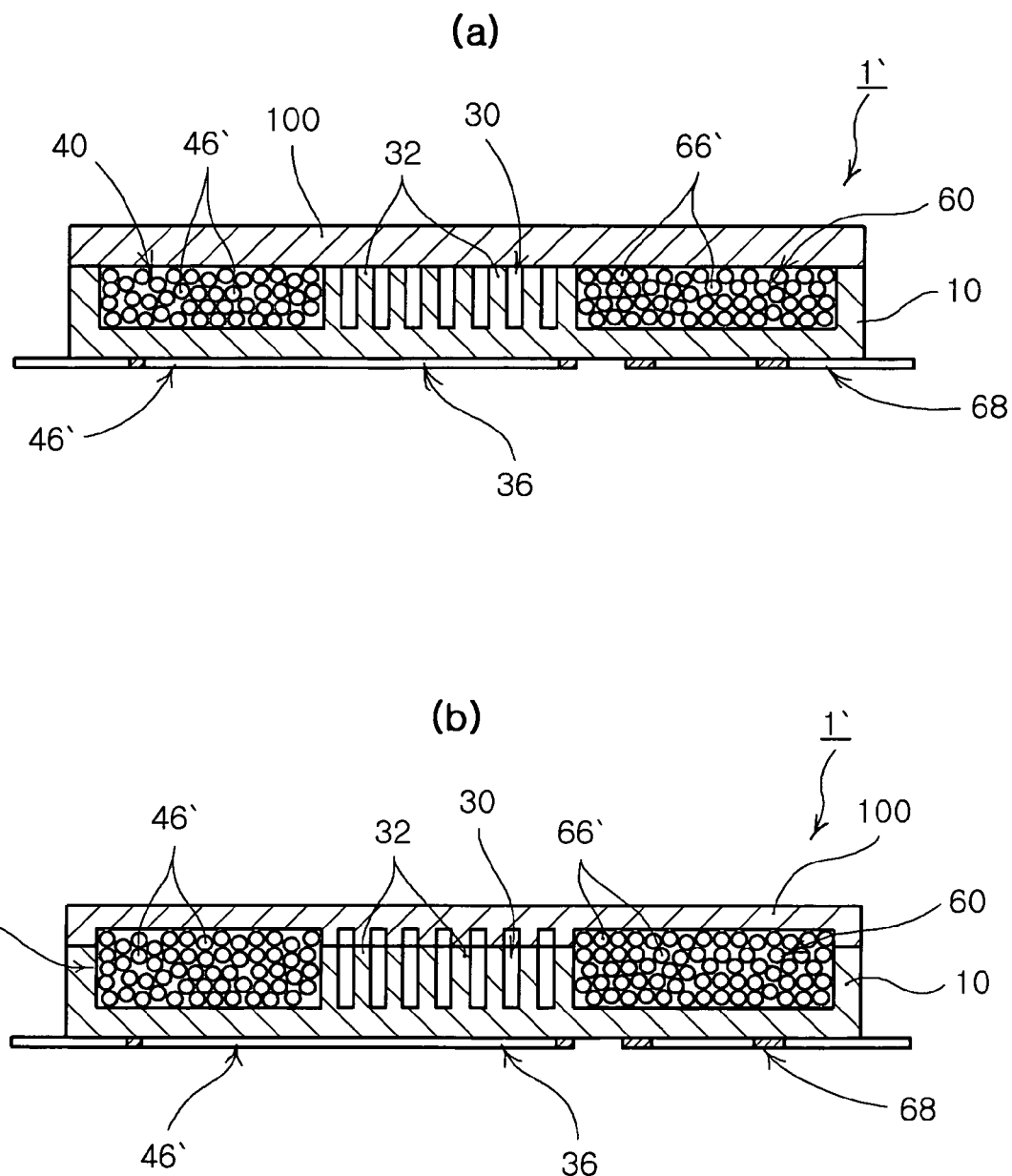
FIG. 7 shows a thin type reforming apparatus having a particle-type catalyst according to another embodiment of the present invention, where 7(a) is a sectional view showing a flat cover structure, and 7(b) is a sectional view showing an uneven cover structure where passages are formed.

That is, in the reforming apparatus 1' according to an alternate embodiment of the present invention shown in FIG. 7, the catalyst 46' may be particles of $Cu/ZnO$ or $Cu/ZnO/Al_2O_3$ that are filled in the passages 42 of the reformer 40. In this case the size of the catalyst 46' particles may be large enough so that they cannot exit into the evaporator 30 at the front of the reformer 40 or exit into the connecting portion 50 at the rear of the reformer 40.

The reformer 40 reforms methanol or other hydrocarbon fuels to hydrogen gas through catalytic conversion accompanying heat absorption. A heat source that is needed for this process takes the form of a heating member 48 formed at the bottom of the substrate 10. The heating member 48 of the reformer 40 is formed in a pattern of an electrically resistant circuit at the bottom surface of the substrate 10, and heats the reformer 40 at the top of the substrate 10 through the substrate 10. The heating member 48 of the reformer 40 may be integrally formed in a single electrically resistant circuit pattern with the heating member 36 of the evaporator 30.

Figure 8:
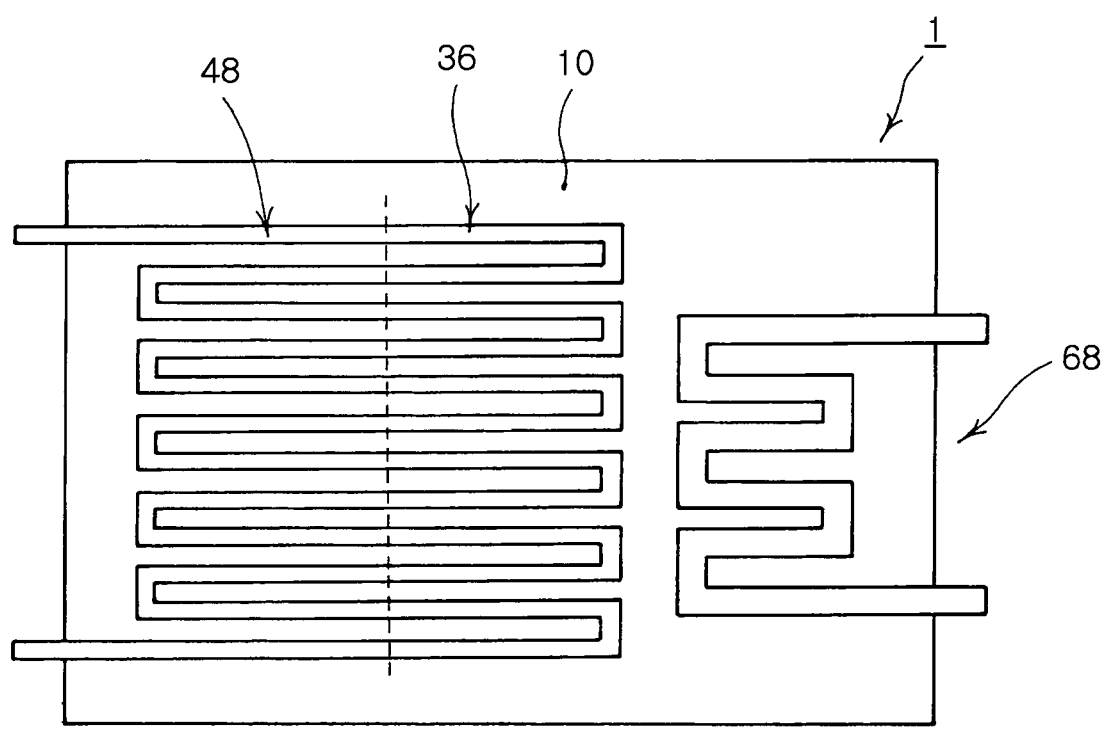
FIG. 8 is a plan view showing a heating member of a thin type reforming apparatus according to the present invention, which is formed as an electrical resistance circuit pattern on the bottom surface of a substrate.

Likewise, the heating member 48 of the reformer 40 is formed on the lower surface of the substrate 10, as shown in FIG. 8, and maintains the reformer 40 through the substrate 10 at a predetermined temperature, preferably between 250-290° C.

Also in the present invention, a passage is formed at the downstream end of the reformer 40 of the substrate, and includes a CO remover 60 that removes CO from the reformed gas generated by the reformer 40.

The CO remover 60 forms a passage on the opposite end of the fuel inlet 20 inside the substrate 10, and removes CO gas included in the hydrogen gas through heat emitting reaction.

The reformer 40 supplies reformed gas including hydrogen gas, carbon monoxide, and carbon dioxide to the CO remover 60, which is supplied through a narrower connecting portion 50 at the end of the passage. The connecting portion 50 extends along the edge of the substrate 10, and a passage expanded portion 54 having a larger passage size than that of the connecting portion 50 is provided at the entrance of the CO remover 60.

The reformed gas including hydrogen gas, carbon monoxide, and carbon dioxide first passes through the narrower connecting portion 50 and is then discharged into the more expansive passage expanded portion 54, leading to a decrease in pressure as it flows toward the CO remover 60.

The CO remover 60 forms a passage 62 through a plurality of partitioning walls 64 as in the reformer 40. At the entrance end of the passage 62, or the passage expanded portion 54, an air entry hole 112 is formed in the cover 100 covering the top of the substrate 10.

A catalyst 66 for removing the CO gas produced by the reformer 40 is coated inside the passage 62.

When the reformed gas that enters the CO remover 60 from the reformer 40 and reacts with oxygen to remove CO, the catalyst 66 used in the CO remover 60 may be one of Pt, Pt/Ru, and $Cu/CeO/Al_2O_3$.

Alternatively, the catalyst used in the CO remover 60 may be a catalyst 66' in the form of particles. That is, the catalyst 66', as shown in FIG. 7, may be particles formed of one of Pt, Pt/Ru, and $Cu/CeO/Al_2O_3$.

The catalyst 66' particles in the CO remover 60 may have a size large enough not to exit to the passage expanded portion 54 at the entrance of the CO remover 60 or to a reformed gas exhaust port 114 at the exit end of the CO remover 60.

The CO remover 60 converts CO (that is harmful to humans) to $CO_2$ (that is not harmful to humans) through catalytic conversion accompanying heat emitting reaction. A heat source needed for this process is a heating member 68 for the CO remover 60, the heat source formed on the bottom of the substrate 10.

The heating member 68 of the CO remover 60 is patterned on the bottom of the substrate 10 in the form of an electrically resistant circuit pattern, as shown in FIG. 8, and heats the CO remover 60 on top of the substrate 10 through the substrate 10.

This heating member 68 of the CO remover 60 is formed in an electrically resistant circuit pattern, and maintains the CO remover 60 at a predetermined temperature of preferably 170-200° C. through an adequate power supply and control thereof.

Figure 6:
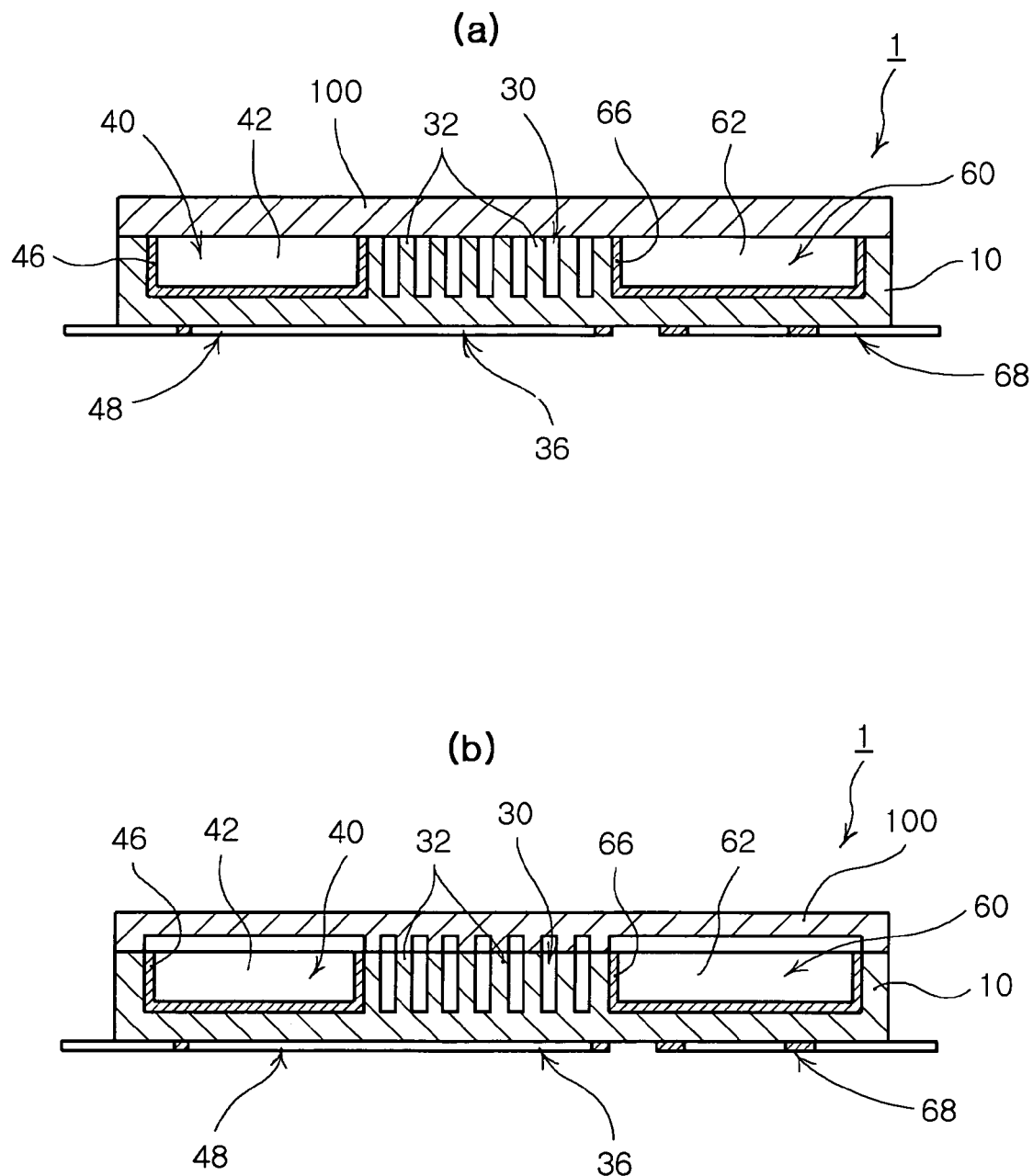
FIG. 6 shows a thin type reforming apparatus according to the present invention, where 6(a) is a sectional view showing a flat cover structure, and 6(b) is a sectional view showing an uneven cover structure where passages are formed.

As shown in FIGS. 6(a) and 7(a), also included in the present invention is a flat cover 100 that covers the top of the substrate 10 and seals the inner space from the outside. The cover 100 may use the same materials as the substrate 10, for example, silicon, metal, glass, ceramic, and heat resistant plastic, and may be integrated by being bonded to the top surface of the substrate 10.

As shown in FIGS. 6(b) and 7(b), the cover 100 may form recessed spaces or passages corresponding to spaces or passages formed by the fuel inlet 20, the evaporator 30, the reformer 40, and the CO remover 60, so that inner volume of the passages formed by the substrate 10 and the cover 100 can be expanded.

When bonded integrally to the substrate 10, the cover 100 forms the reformed gas exhaust port 114 near the exit of the passage 62 of the CO remover 60. That is, reformed gas including hydrogen gas and $CO_2$ is exhausted from the CO remover 60 to the outside of the substrate 10. Accordingly, the cover 100 forms the fuel filling hole 110 at the fuel inlet 20, the air entry hole 112 at the passage expanded portion 54 at the entrance of the CO remover 60, and the reformed gas exhaust port 114 at the exit end of the CO remover 60, so that liquid fuel is reformed into reformed gas including hydrogen and $CO_2$ that is exhausted.

The thin type reforming apparatus 1 according to present invention fills liquid fuel through the fuel filling hole 110 formed in the cover 100 into the inner passage 22 of the fuel inlet 20. The liquid fuel enters the evaporator 30 disposed in the approximate center of the substrate 10 in the form of droplets.

The amount of liquid fuel that enters the evaporator 30 is only about 10-100 µm. This liquid fuel that passes through the fuel inlet 20 enters the evaporator 30 and is vaporized at the temperature necessary for reforming (250-290° C.)

Although the distance in the evaporator within which the fuel is converted from liquid to gas is short, during the vaporizing process the volume of the fuel suddenly increases 1800-fold. Here, if the passages within the evaporator 30 are narrow, the inner pressure increases so that transfer of the methanol gas mixture to catalytic layer is easily accomplished by means of the pressure. However, due to the sudden increase in volume, an increase in back pressure that pushes the fuel in a reverse direction also results.

However, because the evaporator 30 has a drastically increased passage at its entrance to allow gas to spread, and the exit from the fuel inlet 20 to the evaporator 30 is narrow to perform the function of a nozzle, the fuel can be discharged in the form of droplets. In this structure, the inner pressure at the entrance of the evaporator 30 is increased, so that back pressure during evaporation can be effectively countered.

Also, the evaporator 30 includes island-type protruding bubble removers 32 dispersed throughout, so that bubbles that appear during the conversion of liquid to gas can effectively be removed, the increase in pressure within the evaporator 30 can be prevented, and heat transfer efficiency can be increased.

Then, the evaporated fuel enters the reformer 40 formed at the downstream end of the evaporator 30, and undergoes catalytic conversion accompanying heat absorption at a temperature of 250-290° C., where reformed gas including hydrogen gas, CO, and $CO_2$ is generated.

This reformed gas passes through the narrow connecting portion 50 of the passage and flows downstream to the CO remover 60. During this process, high temperature, high pressure reformed gas passes through the narrow connecting portion 50 and depressurizes when it enters the suddenly widened passage expanded portion 54 of the CO remover 60, so that pressure of gas in the passage expanded portion 54 is substantially lower than in the reformer 40.

Then, the reformed gas passes through the air entry hole 112 of the cover 100 over the passage expanded portion 54, passing through the CO remover 60 while air is entering.

Heat radiation occurs in the CO remover 60 at a temperature of 170-200° C., along with catalytic conversion of selective oxidization, converting CO to $CO_2$ in the reformed gas, so that it will be harmless to humans.

In this state, reformed gas including hydrogen gas and the $CO_2$ is created while passing through the CO remover 60, and the reformed gas is exhausted through the reformed gas exhaust port 114 in the cover 100.

Air needed for the oxidization in the CO remover 60 must be supplied from the outside; and in this case, a pump (not shown) for supplying air through the air entry hole 112 in the cover 100 may be a small-capacity compact pump. That is, because reformed gas moves from the reformer 40 through the connecting portion 50 with a small cross-sectional area to the passage expanded portion 54 of the CO remover 60, the drop in inner pressure at the passage expanded portion 54 causes the pressure in the passage expanded portion 54 to be substantially lower than the pressure in the reformer 40, so that outside air can easily enter through the air entry hole 112.

Accordingly, the pump that supplies air to the air entry hole 112 may be smaller compared to those in the related art.

In the above description of the present invention, the heater is formed at the bottom of the evaporator; however, the heater may be removed therefrom, and only the reformer may be used as a heater.

The reforming apparatus according to the present invention has an altered structure that supplies fuel in the form of small droplets, so that the volume-to-surface area ratio of the fuel becomes larger, and a higher evaporation efficiency can be obtained with the same amount of fuel.

Because the entrance passage connecting the fuel inlet to the evaporator becomes narrow, the pressure that injects the liquid fuel through the narrow passage increases, so back pressure caused by a sudden expansion of gas can effectively be prevented from causing reverse flow of fuel at the entrance.

Additionally, the space in the evaporator is drastically expanded and opened so that plenty of room is provided for gas expansion, thus largely obviating the problem of back pressure on the fuel inlet. The pressure within the evaporator decreases due to the expanded passage to counter back pressure.

Furthermore, the evaporator according to the present invention has island-shaped protrusions provided therein to easily remove bubbles formed in liquid fuel when evaporation occurs. Thus, heat transfer efficiency increases, and evaporation of the liquid fuel can be performed efficiently.

Moreover, by supplying the liquid fuel into the evaporator in the form of droplets and smoothly evaporating the liquid fuel without the formation of bubbles, reverse flow of the liquid fuel caused by back pressure can be prevented, and the entire device can be miniaturized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A thin type reforming apparatus used for a fuel cell, comprising:
a substrate having a passage formed therein;
a fuel inlet for introducing fuel to the passage;
an evaporator disposed within the substrate downstream of the fuel inlet, having an open construction without passages and including a bubble remover for imparting a flow resistance to the fuel in a liquid state, removing bubbles and vaporizing the fuel;

a reformer having a passage formed downstream of the evaporator, the reformer reforming the fuel to hydrogen gas through an endothermic reaction;

a CO remover having a passage formed downstream of the reformer, the CO remover removing CO gas included in the hydrogen gas through an exothermic reaction; and a cover for covering an upper portion of the substrate and sealing the passages from an outside, wherein the bubble remover comprises a plurality of island-shaped protrusions-arranged in straight rows and columns so bubbles that begin to form between the island-shaped protrusions are subject to pressure from four directions and are thus burst;

wherein the fuel inlet and the evaporator are disposed between the reformer and the CO remover, and wherein the evaporator, the reformer and the CO remover are divided by walls.

2. The reforming apparatus of claim 1, wherein the evaporator further includes a channel formed at an exit of the fuel inlet, the channel being narrower than a remainder of the fuel inlet.

3. The reforming apparatus of claim 2, wherein the exit at the fuel inlet has a passage width of on the order of 10 μm to 100 μm.

4. The reforming apparatus of claim 1, wherein the reformer is connected through a connecting portion with a narrow cross section to a passage expanded portion of the CO remover, the passage expanded portion having a wider cross section than the connecting portion.

5. The reforming apparatus of claim 1, wherein the passage of the CO remover is formed by a plurality of partitioning walls, and wherein the CO remover has a catalyst of any one selected from the group consisting of Pt, Pt/Ru and Cu/CeO/$Al_2O_3$ deposited on the partitioning walls.

6. The reforming apparatus of claim 1, wherein the passage of the CO remover is formed by a plurality of partitioning walls, and wherein the passage is filled with catalyst particles formed of any one selected from the group consisting of Pt, Pt/Ru and Cu/CeO/$Al_2O_3$.

* * * * *